United States Patent [19]
Feng et al.

[11] Patent Number: 5,400,667
[45] Date of Patent: Mar. 28, 1995

[54] MEANS FOR MEASURING PICTURE QUALITY

[75] Inventors: Yingduo Feng, Toby; Olov Östberg, Stockholm both of Sweden

[73] Assignee: Televerket, Farsta, Sweden

[21] Appl. No.: 30,025

[22] PCT Filed: Sep. 18, 1991

[86] PCT No.: PCT/SE91/00624

§ 371 Date: Mar. 24, 1993

§ 102(e) Date: Mar. 24, 1993

[87] PCT Pub. No.: WO92/05669

PCT Pub. Date: Apr. 2, 1992

[30] Foreign Application Priority Data

Sep. 26, 1990 [SE] Sweden ............................ 9003047
Sep. 26, 1990 [SE] Sweden ............................ 9003048

[51] Int. Cl.⁶ ...................... G01N 21/84; G01N 21/88
[52] U.S. Cl. ........................................ 73/865.8; 283/70; 356/243; 382/1

[58] Field of Search .................. 73/865.8, 1 R; 382/1; 358/10; 356/372, 404, 408, 421, 425, 229, 237, 243; 283/70

[56] References Cited

U.S. PATENT DOCUMENTS

| | | | |
|---|---|---|---|
| 3,505,861 | 4/1970 | Schoeffer et al. | 73/1 R X |
| 4,447,154 | 5/1984 | Fukui | 356/404 |
| 4,730,213 | 3/1988 | Kelly, 3rd et al. | 358/10 X |

*Primary Examiner*—Tom Noland
*Attorney, Agent, or Firm*—Oblon, Spivak, McClelland, Maier & Neustadt

[57] ABSTRACT

The invention relates to a way for subjective, graphical measurement of picture sharpness/picture quality. Measuring and assessing picture quality have so far been a time-consuming chore for laboratory engineers having access to expensive and complicated electro-optical measuring equipments. The way described enables an unknown text object to be measured with respect to objective and subjective picture quality using for example a series of previously measured paper pictures in a simple and reliable way.

3 Claims, 3 Drawing Sheets

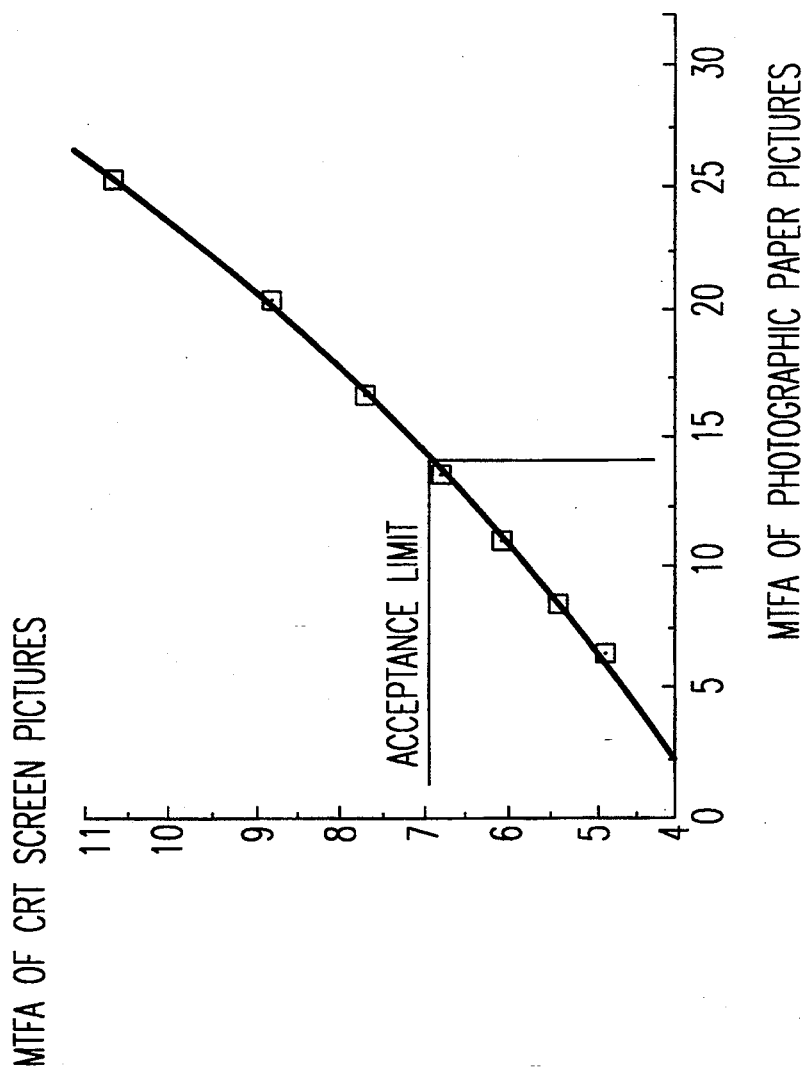

THE LINGON BERRY USUALLY RIPENS IN
SEPTEMBER AND VISIBILITY IS SOMEWHAT
IMPEDED ON THE CURVES; NONETHELESS
MANY PEOPLE ENJOY WALKING [IN LIEU OF DRIVING]
IN THE MOUNTAINS.

MTFA: 10.6
PICTURE QUALITY: VERY GOOD

.
.
.

THE LINGON BERRY USUALLY RIPENS IN
SEPTEMBER AND VISIBILITY IS SOMEWHAT
IMPEDED ON THE CURVES; NONETHELESS
MANY PEOPLE ENJOY WALKING [IN LIEU OF DRIVING]
IN THE MOUNTAINS.

MTFA: 7.7
PICTURE QUALITY: ACCEPTABLE

.
.
.

THE LINGON BERRY USUALLY RIPENS IN
SEPTEMBER AND VISIBILITY IS SOMEWHAT
IMPEDED ON THE CURVES; NONETHELESS
MANY PEOPLE ENJOY WALKING [IN LIEU OF DRIVING]
IN THE MOUNTAINS.

MTFA: 5.4
PICTURE QUALITY: VERY POOR

MEANS FOR MEASURING PICTURE QUALITY

FIELD OF THE INVENTION

The present invention relates to a means for subjective, graphical measurement of picture sharpness/picture quality of photographical, optical, electro-optical and electronical display media, such as computer screens, photographic prints and other types of pictures, print-outs etc. The invention provides a set of test gauges for obtaining measurement of the picture quality in a simple and reliable way. Using the test gauges the measurement can be performed for instance in an office environment and by a person who neither has knowledge about or access to conventional electro-optical measuring equipment.

STATE OF THE ART

Measuring and assessing picture quality has so far been a time-consuming chore for laboratory engineers having access to expensive and complicated electro-optical measuring equipments. There are measuring rods for measuring and judging colour saturation, chrominance and density. There are also research results relating to the objective measure and subjective judgement scale of picture quality and the connection between these. Despite this nobody has so far been able to use the theories of picture quality research to meet the users' desires to measure and judge their picture material, such as computer screens, photographs and other types of pictures and print-outs with respect to picture sharpness and picture quality in a simple and reliable way.

According to the invention the problem is solved by providing a set of test gauges enabling direct reading of physical measurement results as well as the corresponding subjective expressions.

SUMMARY OF THE INVENTION

Thus, the present invention provides a means for measuring picture quality of display media. According to the invention a set of test gauges is provided containing pictures/text with varying and physically well-defined picture qualities to read directly the physical measurement results as well as corresponding subjective expressions of a picture or text with respect to picture quality. The invention is defined in the accompanying claims.

BRIEF DESCRIPTION OF THE DRAWINGS

The invention will be described hereafter with reference to the accompanying drawings, in which FIG. 3 is a diagram derived from FIGS. 1 and 2 of the relationship between photoprints and screen images, and FIG. 4 shows an example of a selection of test gauges.

DETAILED DESCRIPTION OF THE INVENTION

Figure 1:
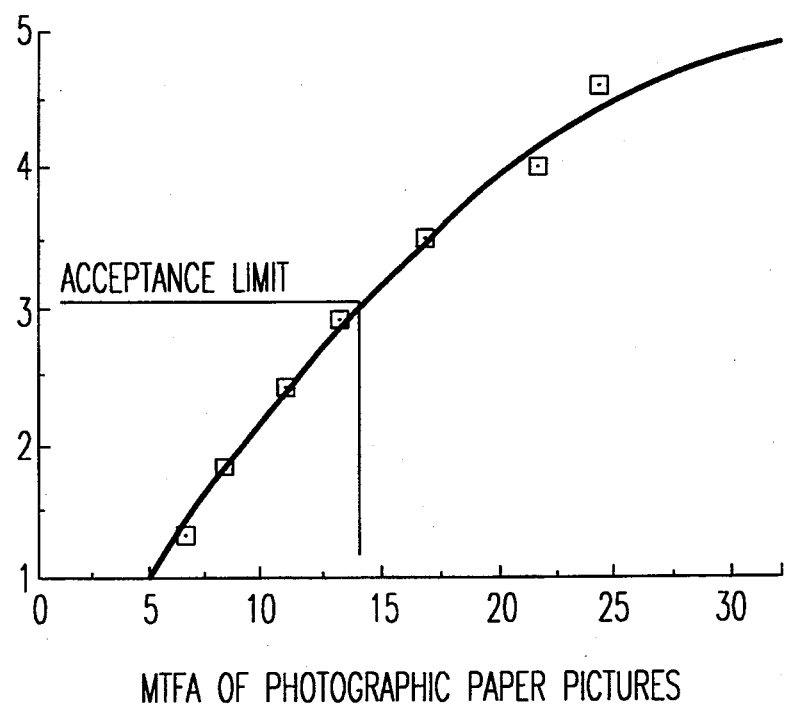
FIG. 1 is a diagram of the relationship between subjective and objective picture quality Of photographic prints.

The present invention enbables measurement and assessment of picture quality of for instance screen images, television sets, photographic prints, telecopier print-outs and newspaper pictures etc. using a set of test gauges, for example in the form of measuring rods, in a simple and reliable way. Using the test gauges the measurement can be performed for example in an office environment and by a person who neither has knowledge about or access to conventional electro-optical measuring equipment.

The test gauges, precision-made in laboratory environment, consist of a series of images of one and the same subject, for example a picture or a text, with varying picture quality. Each test gauge in the series is characterized firstly of an objective picture quality measure, for instance MTFA (Modulation Transfer Function Area), and secondly a subjective measure expressed as quality judgements such as "excellent", "good", "acceptable", "poor" or "very poor". Using the series of such test gauges an unknown object, for instance a computer screen image, can be graduated with respect to objective as well as subjective picture quality.

In the present description MTFA has been chosen as an example of an objective picture quality measure (see for instance "American National Standard for Human Factors Engineering of Visual Display Terminal Workstations", ANSI/HFS Standard No. 100-1988, Santa Monica, Calif.: Human Factors Society, 1988). It is defined as the area between the CSF (Contrast Sensitivity Function) and the MTF graphs (Modulation Transfer Function). The CSF graph describes how the contrast sensitivity of the visual system varies with spatial frequencies. The MTF graph describes the transfer characteristics of an optical display system and is defined as the absolute value of the Fourier transform of the Point Spread Function PSF of the optical system. The PSF is derived from the luminance distribution of the least resolvable element of the display system. The MTFA is measured using a microphotometer, the photo sensor of which suitably consists of a CCD detector.

As subjective picture quality measure in the present description the CCIR scale recommended for assessment of the quality of television pictures has been chosen. According to "Method for the subjective assessment of the quality of television pictures", Recommendations and Reports of the CCIR; vol XI, Part 1, 1986, (pages 165–173), Rec. 500–3) an average assessment should be based on the participation of at least 20 subjects.

Definition:
TN: Test gauges (in any medium).
OX: The unknown picture object (in any medium).
TN and OX can for example be produced by photographical, optical, electro-optical or electronical display media. The medias TN and OX may actually be the same medium.

The TN series is precision-made in laboratory environment. The number and size of the intervals between the steps in the series are arbitrary but are given by the range and the precision desired for the existing OX.

Each step in the TN series is defined by an objective picture quality measure (e.g. MTFA) and the associated subjective picture quality measure (e.g. determined according to the CCIR method). In the laboratory environment the picture quality measure of the TN series is graduated against a directly measured comparison series of the OX medium.

EXAMPLES

TN series: Test gauges in the form of photographic prints.
OX: Screen image.

Initially objective MTFA measurement for the TN series is performed. Next, by means Of the CCIR method, a relationship between the MTFA values and the subjectively experienced picture quality is established, see FIG. 1.

In order to be able to measure the picture quality using the photoprints (the TN series) of a screen image (OX) the picture quality measure of the photoprints (paper pictures) has to be graduated against a number of screen images of varying picture quality. This is done in the laboratory, where first direct MTFA measurements, and secondly the corresponding subjective quality assessments can be made for a suitable series of screen images, see FIG. 2.

Figure 2:
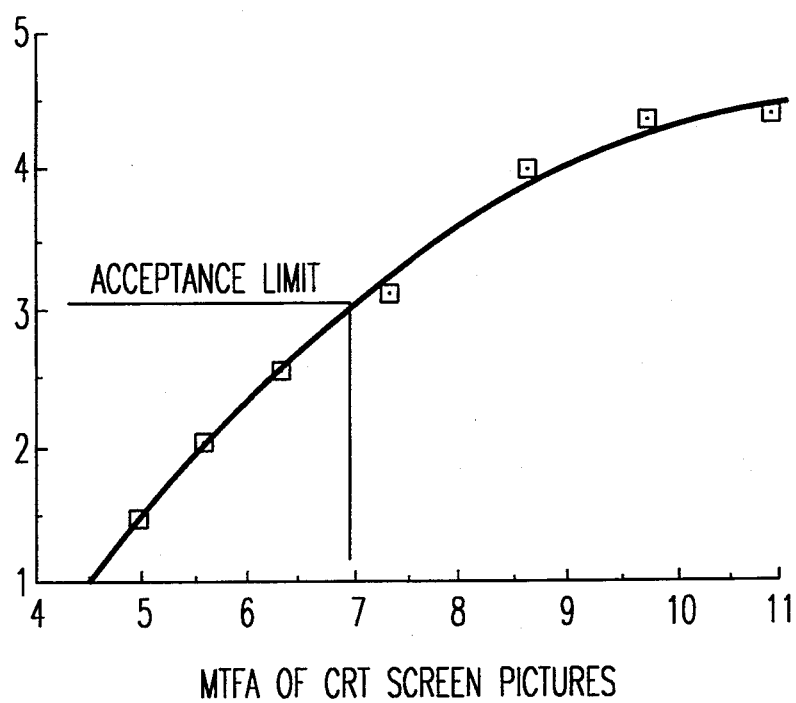
FIG. 2 is the corresponding diagram of computer screen images.

The information of FIGS. 1 and 2 has subjective picture quality as a common parameter. Thereby an unambiguous relationship between the MTFA of photoprints and the MTFA of screen images can be derived, as is shown in FIG. 3.

The directly measured MTFA values of the TN series are only auxiliary values. A subjective CCIR value is associated with each such auxiliary value (Photoprint MTFA⇌CCIR). Also a CCIR value and a MTFA value (CCIR⇌Screen image MTFA) belong to each screen image. Thus, each photoprint (in the TN series) may be graduated directly in a CCIR value and a MTFA value valid for screen images (of OX type).

With the TN series of the example consisting of 7 photographic prints the graduating process in the laboratory will be:

| Gauge No. | ⟷ | Photoprint MTFA | ⟷ | CCIR value | ⟷ | Screen image MTFA |
|---|---|---|---|---|---|---|
| 1 | ⟷ | 25,5 | ⟷ | Very good | ⟷ | 10,6 |
| 2 | ⟷ | 20,6 | ⟷ | Good | ⟷ | 8,7 |
| 3 | ⟷ | 16,8 | ⟷ | Acceptable | ⟷ | 7,7 |
| 4 | ⟷ | 13,6 | ⟷ | Poor | ⟷ | 6,8 |
| 5 | ⟷ | 10,9 | ⟷ | Poor | ⟷ | 6,1 |
| 6 | ⟷ | 8,5 | ⟷ | Very poor | ⟷ | 5,4 |
| 7 | ⟷ | 6,4 | ⟷ | Very poor | ⟷ | 4,9 |

The TN Series above consisting of 7 photoprints constitutes a measuring scale for establishing MTFA values and CCIR values for screen images of OX type. Assume that a given screen image (of OX type) is experienced subjectively to have the same picture quality as photoprint No. 3. In accordance with the graduation produced in the laboratory it is thereby established that the screen image has a MTFA value of 7.7 and that the screen image quality is acceptable.

FIG. 4 shows an example of how a selection of test gauges can be formed with the MTFA measure of screen images given.

To achieve high precision a separate TN series should be produced for each type of OX; one series for screen image type A with the typeface X, one series for screen image type B with the typeface Y, etc.

A TN series can be produced in several different ways, as an unfoldable fan with one test gauge per segment of the fan, as a strip with test gauges arranged in a row, etc.

I claim:

1. A device for measuring picture quality of display media, comprising:
    a set of test gauges containing pictures/text with varying and physically well-defined picture qualities for direct reading of physical measurement results as well as the corresponding subjective expression of the picture or the text with respect to picture quality
    wherein said test gauges are produced in a series with a subjective picture quality ranging from very poor to very good.

2. A device according to claim 1, wherein said test gauges are selected based upon the field of application of said image and wherein said field is selected from the group of photographical, optical, electro-optical or electronical display media and with photographical, optical, electro-optical or electronical production techniques including screening.

3. A device according to claim 2, wherein said test gauges are photographically produced prints depicting the picture of the display media under test.

* * * * *

UNITED STATES PATENT AND TRADEMARK OFFICE
CERTIFICATE OF CORRECTION

PATENT NO. : 5,400,667
DATED : March 28, 1995
INVENTOR(S) : Yingduo FENG, et al.

It is certified that error appears in the above-indentified patent and that said Letters Patent is hereby corrected as shown below:

On the title page, Item [75], the first inventor's city of residence should read:

--Tāby--

Signed and Sealed this

Thirteenth Day of June, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,400,667
DATED : March 28, 1995
INVENTOR(S) : Yingduo Feng, et al.

It is certified that error appears in the above-indentified patent and that said Letters Patent is hereby corrected as shown below:

The sheet of drawing, consisting of Figure 4, should be deleted to appear as per attached Fig. 4.

Signed and Sealed this

Sixteenth Day of July, 1996

*Attest:*

BRUCE LEHMAN

*Attesting Officer*     Commissioner of Patents and Trademarks

THE LINGON BERRY USUALLY RIPENS IN
SEPTEMBER AND VISIBILITY IS SOMEWHAT
IMPEDED ON THE CURVES; NONETHELESS
MANY PEOPLE ENJOY WALKING [IN LIEU OF DRIVING]
IN THE MOUNTAINS.

MTFA: 10.6
PICTURE QUALITY: VERY GOOD

THE LINGON BERRY USUALLY RIPENS IN
SEPTEMBER AND VISIBILITY IS SOMEWHAT
IMPEDED ON THE CURVES; NONETHELESS
MANY PEOPLE ENJOY WALKING [IN LIEU OF DRIVING]
IN THE MOUNTAINS.

MTFA: 7.7
PICTURE QUALITY: ACCEPTABI

THE LINGON BERRY USUALLY RIPENS IN
SEPTEMBER AND VISIBILITY IS SOMEWHAT
IMPEDED ON THE CURVES; NONETHELESS
MANY PEOPLE ENJOY WALKING [IN LIEU OF DRIVING]
IN THE MOUNTAINS.

MTFA: 5.4
PICTURE QUALITY: VERY POOR

*FIG. 4*